(12) United States Patent
Venkata

(10) Patent No.: US 11,264,021 B2
(45) Date of Patent: Mar. 1, 2022

(54) METHOD FOR INTENT-BASED INTERACTIVE RESPONSE AND ELECTRONIC DEVICE THEREOF

(71) Applicant: SAMSUNG ELECTRONICS CO., LTD., Suwon-si (KR)

(72) Inventor: Phani Avadooth Rekapalli Veera Venkata, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 139 days.

(21) Appl. No.: 16/297,076

(22) Filed: Mar. 8, 2019

(65) Prior Publication Data

US 2019/0279633 A1 Sep. 12, 2019

(30) Foreign Application Priority Data

Mar. 8, 2018 (IN) .............................. 201841008507

(51) Int. Cl.
| | |
|---|---|
| *G06T 7/70* | (2017.01) |
| *G10L 15/22* | (2006.01) |
| *G06F 3/16* | (2006.01) |
| *G06K 9/32* | (2006.01) |

(52) U.S. Cl.
CPC ............. *G10L 15/22* (2013.01); *G06F 3/167* (2013.01); *G06K 9/3241* (2013.01); *G06T 7/70* (2017.01)

(58) Field of Classification Search
CPC ..................................................... H04N 5/232
See application file for complete search history.

(56) References Cited

U.S. PATENT DOCUMENTS

| | | | | |
|---|---|---|---|---|
| 5,696,962 | A * | 12/1997 | Kupiec | G06F 16/3338 |
| 7,778,948 | B2 * | 8/2010 | Johnson | G09B 7/02 |
| | | | | 706/45 |
| 9,870,521 | B1 * | 1/2018 | Solh | G06T 7/246 |
| 9,911,290 | B1 * | 3/2018 | Zalewski | G06Q 20/327 |
| 10,255,525 | B1 * | 4/2019 | Totolos, Jr. | G06T 7/13 |
| 10,346,129 | B1 * | 7/2019 | Jaini | G06F 16/9535 |
| 10,719,993 | B1 * | 7/2020 | Ha | G06F 3/0346 |
| 2003/0217052 | A1 * | 11/2003 | Rubenczyk | G06F 16/3323 |
| 2005/0222973 | A1 * | 10/2005 | Kaiser | G06F 16/93 |
| 2005/0251214 | A1 * | 11/2005 | Parascandola | A61B 5/4848 |
| | | | | 607/5 |

(Continued)

FOREIGN PATENT DOCUMENTS

WO 2017/090115 A1 6/2017

OTHER PUBLICATIONS

Communication dated Jul. 8, 2020 issued by the Indian Patent Office in Indian counterpart Application No. 201841008507.

(Continued)

*Primary Examiner* — Jakieda R Jackson
(74) *Attorney, Agent, or Firm* — Sughrue Mion, PLLC

(57) ABSTRACT

A method for providing intent-based interactive voice response by an electronic device. The method includes receiving, by the electronic device, a voice input while obtaining an image of an object by using an image sensor, and generating an interactive voice response associated with the object based on the voice input. The method may further include determining a first intent and a second intent from the voice input, and generating an interactive voice response to the voice input, based on the first intent and the second intent.

10 Claims, 9 Drawing Sheets

(56) References Cited

U.S. PATENT DOCUMENTS

| | | | |
|---|---|---|---|
| 2007/0104341 A1* | 5/2007 | Kondo | G06T 7/70 381/306 |
| 2010/0241732 A1* | 9/2010 | del Valle Lopez | G06F 9/542 709/219 |
| 2011/0037742 A1* | 2/2011 | Suh | G06F 3/1431 345/211 |
| 2011/0118870 A1* | 5/2011 | Sugihara | G06N 3/008 700/245 |
| 2013/0081030 A1* | 3/2013 | Levien | G06F 9/46 718/102 |
| 2013/0100306 A1* | 4/2013 | Bekiares | G06T 7/70 348/211.99 |
| 2013/0158984 A1* | 6/2013 | Myslinski | G06F 16/951 704/9 |
| 2013/0325463 A1* | 12/2013 | Greenspan | G06F 3/04842 704/235 |
| 2013/0339021 A1* | 12/2013 | Deshmukh | G10L 21/10 704/257 |
| 2013/0342647 A1* | 12/2013 | Takahashi | G06T 3/0093 348/43 |
| 2014/0006033 A1* | 1/2014 | Jung | G10L 15/22 704/275 |
| 2014/0135117 A1* | 5/2014 | Abe | A63F 13/5252 463/31 |
| 2014/0136187 A1* | 5/2014 | Wolverton | G10L 15/22 704/9 |
| 2014/0176603 A1 | 6/2014 | Kumar et al. | |
| 2014/0201182 A1 | 7/2014 | Amin et al. | |
| 2014/0237467 A1* | 8/2014 | Heddleston | G06Q 30/02 717/176 |
| 2014/0253666 A1 | 9/2014 | Ramachandran et al. | |
| 2014/0292645 A1* | 10/2014 | Tsurumi | G06T 19/006 345/156 |
| 2014/0317511 A1* | 10/2014 | Bailiang | G09B 29/106 715/730 |
| 2014/0324648 A1* | 10/2014 | Mori | G06F 3/167 705/31 |
| 2015/0088923 A1 | 3/2015 | Garcia-Barrio et al. | |
| 2015/0149168 A1* | 5/2015 | Stent | G10L 15/26 704/235 |
| 2015/0279369 A1* | 10/2015 | Lee | H04N 21/431 704/275 |
| 2016/0019240 A1 | 1/2016 | Hammontree et al. | |
| 2016/0035132 A1* | 2/2016 | Shuster | G06T 19/006 345/633 |
| 2016/0078488 A1* | 3/2016 | Simo | G06Q 30/0269 705/14.66 |
| 2016/0085873 A1* | 3/2016 | Yau | G06F 16/9554 235/375 |
| 2016/0088031 A1* | 3/2016 | Kumar | H04L 65/60 709/204 |
| 2016/0103655 A1* | 4/2016 | Klein | G10L 15/22 704/275 |
| 2016/0154777 A1 | 6/2016 | Shin et al. | |
| 2016/0196264 A1* | 7/2016 | Bostick | H04N 5/23222 707/706 |
| 2017/0160813 A1 | 6/2017 | Divakaran et al. | |
| 2017/0374273 A1* | 12/2017 | Butts | G10L 15/22 |
| 2018/0018144 A1* | 1/2018 | Morris | G06F 3/013 |
| 2018/0040325 A1* | 2/2018 | Melanson | G10L 17/24 |
| 2018/0052885 A1 | 2/2018 | Gaskill et al. | |
| 2018/0151176 A1* | 5/2018 | Qian | G06F 3/017 |
| 2018/0253902 A1* | 9/2018 | Inomata | H04L 67/38 |
| 2018/0260448 A1* | 9/2018 | Osotio | G06F 16/24575 |
| 2018/0357479 A1* | 12/2018 | Swaminathan | G06K 9/325 |
| 2019/0019508 A1 | 1/2019 | Rochford et al. | |
| 2019/0080168 A1* | 3/2019 | Nowak-Przygodzki | G06F 3/0481 |
| 2019/0114478 A1* | 4/2019 | Xi | G06F 3/04883 |
| 2019/0147862 A1* | 5/2019 | Lu | G06F 16/951 704/251 |
| 2019/0236416 A1* | 8/2019 | Wang | G06F 3/167 |
| 2019/0266799 A1* | 8/2019 | Haerihosseini | B31D 5/0086 |

OTHER PUBLICATIONS

International Search Report (PCT/ISA/210) dated Jun. 20, 2019 issued by the International Searching Authority in International Application No. PCT/KR2019/002719.

Written Opinion (PCT/ISA/237) dated Jun. 20, 2019 issued by the International Searching Authority in International Application No. PCT/KR2019/002719.

Communication dated Jan. 12, 2021 issued by the European Intellectual Property Office in counterpart European Application No. 19764691.2.

* cited by examiner

METHOD FOR INTENT-BASED INTERACTIVE RESPONSE AND ELECTRONIC DEVICE THEREOF

CROSS-REFERENCE TO RELATED APPLICATION

This application is based on and claims priority under 35 U.S.C. § 119(a) of an Indian patent application number 201841008507, filed on Mar. 8, 2018, the disclosure of which is incorporated by reference herein in its entirely.

FIELD

The disclosure relates to providing an interactive voice response, more particularly to a method and system for providing an intent-based interactive voice response.

BACKGROUND

Interactive voice response (IVR) systems can interact with a user or a customer to gather information and respond appropriately. Typically, interactive voice response systems allow users to present any query and can provide pre-recorded responses. In the related art, some IVR systems employ speech recognition to evaluate the query from the user and respond appropriately.

While existing IVR systems can successfully determine a user's intent from the query, it is typically dependent on the user to provide the intent as part of the query. Typically, the IVR systems can recognize only a specific set of terms and therefore restrict the user in using these terms. As a result, a customer's experience can be compromised. There is a need to enhance the IVR systems with determination of user or customer intent.

The above information is presented as background information only to help the reader to understand the present disclosure. Applicants have made no determination and make no assertion as to whether any of the above might be applicable as prior art with regard to the present application.

OBJECT

An embodiment of the disclosure provides a method for providing an intent-based voice response to a user query.

An embodiment of the disclosure provides a method to associate an intent to a physical object.

An embodiment of the disclosure provides a method to obtain a voice output response matching the intent.

An embodiment of the disclosure provides a method for determination of a super intent and a sub-intent based on the intent and the associated physical object.

An embodiment of the disclosure provides a system that provides a response to the user query in the voice matching the intent.

SUMMARY

According to an embodiment of the disclosure, a method for providing intent-based interactive voice response by an electronic device is provided.

According to one embodiment of the disclosure, a method for operating an electronic device is provided. The method may include obtaining a voice input from a user, while obtaining an image of an object by using an image sensor; generating a response associated with the object based on the voice input and the image; and outputting the response to the user.

According to another embodiment, generating the response comprises ranking plural responses by relevance to the voice input, and selecting a response from the plural responses with a highest relevancy ranking.

According to another embodiment, the method may include recognizing the object based on information received from an imaging sensor of the electronic device.

According to another embodiment, the generating the response comprises determining at least one intent of the user from the voice input; and generating the response based on the at least one intent.

According to another embodiment, determining the at least one intent comprises: identifying the object; determining a context of the object based on a plurality of contextual characteristics; determining usage characteristics of the object based on a usage history associated with the user and the object; determining a first intent from the voice input based on the context of the object; and determining a second intent from the voice input based on the usage characteristics.

According to another embodiment, the plurality of contextual characteristics comprises at least one from among a visual cue from the user while providing the voice input, a focal length of an imaging sensor of the electronic device, a distance between the user and the object, or an object usage behavior of the user.

According to another embodiment, the response comprises an auditory response and a visual representation.

According to another embodiment, generating the response comprises: selecting a voice prompt for providing the response from among a plurality of pre-stored voice prompts; and generating the response based on the selected voice prompt.

According to another embodiment, each of the voice prompts is associated with a plurality of characteristics, and the plurality of characteristics comprises at least one from among an experience of an expert associated with the object, a level of knowledge of the expert about the object, a designation of the expert, or an interaction pattern of the user with the expert.

According to another embodiment, the method may further include displaying information regarding an alternative response; and outputting the alternative response in response to a selection of the user.

According to another embodiment, an electronic device may be implemented, the electronic device comprising: a memory; and a processor configured to: obtain, via a microphone, a voice input from a user, while obtaining an image of an object by using an image sensor; generate a response associated with the object based on the voice input and the image; and control a display or speaker to output the response to the user.

According to another embodiment, the processor is further configured to rank plural responses by relevance to the voice input, and select a response from the plural responses with a highest relevancy ranking.

According to another embodiment, the processor is further configured to recognize the object based on information received from the imaging sensor.

According to another embodiment, the processor is further configured to: determine at least one intent of the user from the voice input; and generate the response based on the at least one intent.

According to another embodiment, the processor is further configured to determine the at least one intent by: identifying the object; determining a context of the object based on a plurality of contextual characteristics; determining usage characteristics of the object based on a usage history associated with the user and the object; determining a first intent of the voice input based on the context of the object; and determining a second intent from the voice input based on the usage characteristics.

According to another embodiment, the plurality of contextual characteristics comprises at least one from among a visual cue from the user while providing the voice input, a focal length of an imaging sensor of the electronic device, a distance between the user and the object, or an object usage behavior of the user.

According to another embodiment, the response comprises an auditory response and a visual representation.

According to another embodiment, the processor is further configured to generate the response by: selecting a voice prompt for providing the response from among a plurality of pre-stored voice prompts; and generating the response based on the selected voice prompt.

According to another embodiment, each of the voice prompts is associated with a plurality of characteristics, and the plurality of characteristics comprises at least one from among an experience of an expert associated with the object, a level of knowledge of the expert about the object, a designation of the expert, or an interaction pattern of the user with the expert.

According to another embodiment, the processor is further configured to: control a display to display information regarding an alternative response; and output the alternative response in response to a selection of the user.

According to yet another embodiment, an electronic apparatus may be provided, and said electronic apparatus may include a microphone; an image sensor; a speaker; a memory; and a processor configured to: obtain, via the microphone, a voice input from a user; control the image sensor to obtain an image of an object; recognize the object in the image; generate a voice response, based on the voice input and the recognized object; and control the speaker to output the response to the user.

According to yet another embodiment, a method for operating an electronic device, may be provided, the method comprising: displaying an image of a purchasable product on a display screen; receiving a voice inquiry relating to the purchasable product from a user; generating, based on the voice inquiry and the purchasable product, an auditory response to the voice inquiry; and outputting the auditory response to the user.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

Exemplary embodiments are illustrated in the accompanying drawings, throughout which like reference letters indicate corresponding parts in the various figures. The embodiments herein will be better understood from the following description with reference to the drawings, in which.

Figure 1A:
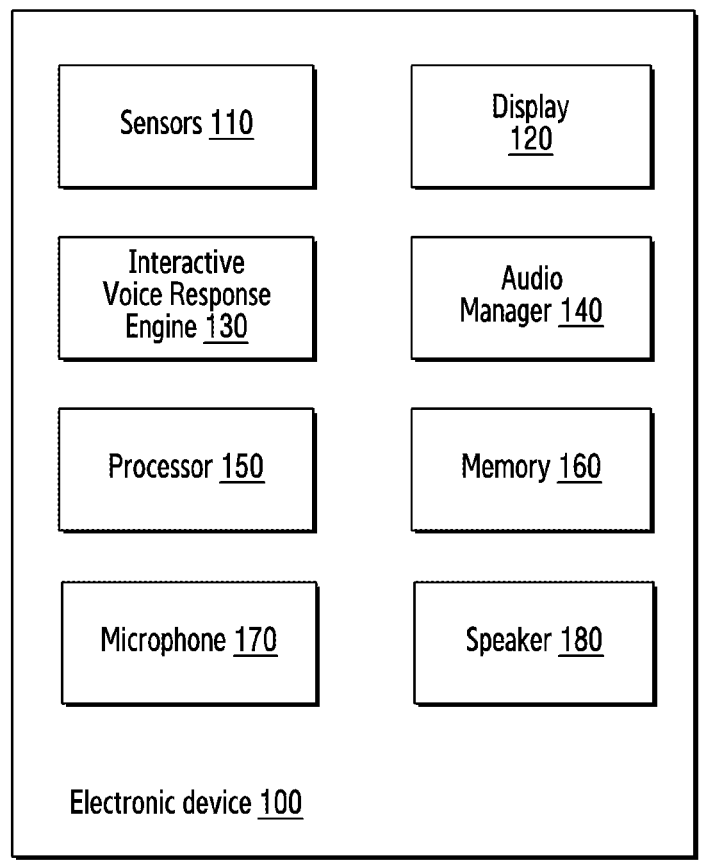
FIG. 1A illustrates various hardware components of an electronic device, according to an embodiment as disclosed herein.

While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

DETAILED DESCRIPTION

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein. Accordingly, the examples should not be construed as limiting the scope of the embodiments herein. Further it should be possible to combine the flows specified in different figures to derive a new flow.

As is traditional in the field, embodiments may be described and illustrated in terms of blocks which carry out a described function or functions. These blocks, which may be referred to herein as managers, engines, controllers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Accordingly, the exemplary embodiments disclosed herein provide a method for voice interaction that includes receiving a voice query by an electronic device from a user. The voice query is associated with a physical object. An intent, a super-intent and a sub-intent are identified by the electronic device from the voice query. The intent, the super-intent and the sub-intent correspond to the usage of the physical object by the user. A voice response to the voice query is generated by the electronic device based on the super-intent and the sub-intent. The voice response is generated from a voice set selected by the electronic device to be the most relevant voice of product supply chain pertaining to the physical object.

In the disclosure, the "intent" may mean a natural language understanding of what a user has provided as at least one voice input and its relevance as per current context for the objects involved. For example, in a restaurant scenario, if a voice input includes 'How much can I consume' when showing bottle of wine, the intent is quantity of particular wine that user can consume. In various embodiments, the intent may be determined based on the at least one of the voice input, a gesture of the user or an image captured by a camera.

In the disclosure, the sub-intent may mean an understanding as to why a user is speaking this particular utterance with relevance to the object involved, associated with activities of the user. For example, in a restaurant scenario, after determining intent, determining the sub-intent would involve understanding why the user has given this utterance (e.g., the voice input), based on a next activity of the user (e.g., driving home). In various embodiments, the sub-intent may be determined based on the at least one of the intent or additional information (e.g., information regarding at least one activity of the user).

In the disclosure, the super-intent may mean associating what other linked objects, services or object characteristics would be of interest to the user considering the intent and/or the sub-intent. For example, in restaurant scenario, the super-intent would be to associate purchase of wine bottle for the user to carry home. In various embodiments, the super-intent may be determined based on the intent and the sub-intent.

Referring now to the drawings and more particularly to FIGS. 1A through 8, where similar reference characters denote corresponding features consistently throughout the figure, exemplary embodiments are shown.

Figure 1B:
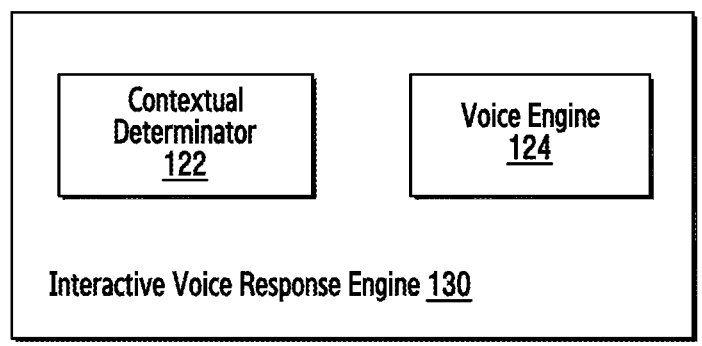
FIG. 1B illustrates various hardware components of an interactive voice response (IVR) engine, according to an embodiment as disclosed herein.

FIG. 1A illustrates an electronic device 100 with various hardware components. The electronic device 100 includes sensors 110, a display 120, an interactive voice response engine 130, an audio manager 140, a processor 150 and a memory 160. FIG. 1B further illustrates hardware components of the interactive voice response engine 130 that include a contextual determining module 122 and a voice engine 124. The electronic device 100 may be a smartphone, a tablet, a smartwatch, a wearable computing device, a smart speaker, a laptop computer, or another type of portable computing device.

In some embodiments, the electronic device 100 can include communication units capable of communication with remote computers, servers or remote databases over a communication network. The communication network can include a data network such as, but not restricted to, the Internet, a cellular telephone network, a local area network (LAN), a wide area network (WAN), or a metropolitan area network (MAN), etc. In certain embodiments, the communication network can include a wireless network, such as, but not restricted to, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), Long-Term Evolution (LTE), or fifth-generation networks (5G) etc. Accordingly, the electronic device 100 is included with communication components facilitating communications over the communication network. In some embodiments, the electronic device 100 can be part of an Internet of Things (IoT) network. The communication units can include circuitry for communication with any of the above-described networks, such as a Wi-Fi transceiver, an LTE transceiver, or a 5G transceiver. The communication units could also include a wired connection interface such as a USB or Ethernet port.

In some embodiments, the interactive voice response engine 130 can be in communication with a server (not shown in FIGS. 1A and 1B) through a communication network. The server can include the context determining module 122 and the voice engine 124 and is utilized to determine the intent, the super-intent and the sub-intent. Further, the server can identify the object based on an image or moving image of the object captured by the sensors 110. However, the context determining module 122 and the voice engine 124 could also be embodied as part of the electronic device 100.

The sensors 110 can include image sensors. The sensors 110 may include a camera, or CMOS image sensors. The sensors 110 can be communicably coupled to a viewport (not shown) provided on the electronic device 100. The user points the viewport at a physical object and provides a voice input that is captured by a microphone or a plurality of microphones 170 provided with the electronic device 100. The microphone or microphones may be wireless and separate from the electronic device 110 in some embodiments. The sensors 110 capture an image of the physical object. The object is dynamically recognized by the server using the captured image. In some embodiments, the server employs deep neural network spatio-temporal techniques of multiple object perception and identification. In some embodiments, the sensors 110 may read computer-readable media such as QR codes and obtain information from the QR code.

Spatio-temporal techniques relate to deep neural network-based models trained to identify the object pointed at by the user and the various components of the object. Specifically, regions of the object are marked on images of the object obtained from multimodal databases over the Internet or from the server. In some embodiments, the manufacturer can provide multimodal content through the server such that the object pointed at by the user is compared to corresponding images from the multimodal content. The server is trained to identify changes in the image of the object in order to gain an ability to accurately determine the various components of the object.

The display 120 provides the image of the object on a screen of the electronic device 100. That is, the display may be a display screen such as an liquid crystal display (LCD) or organic light emitting diode (OLED) display. The display may also be a touchscreen display. Further, a user interface can be displayed on the display using a set of instructions stored in the memory 160 and executed by the processor 150 that enables the user to provide touch cues on the displayed image of the object. The user may zoom in or zoom out with regard to the displayed image. Further, the user may point at specific components of the object. All touch cues can be detected through the user interface. The touch cues along with the voice input are used to determine the input, the super-intent and the sub-intent and accordingly a relevant voice response to the voice input is generated by the server and provided to the user. The electronic device 100 can include speakers 180 or a headphone jack (not shown) that outputs the voice response.

The audio manager 140 receives the voice input from the microphone 170. The audio manager may include audio control circuitry, such as a digital-to-analog converter (DAC), which converts digital data to analog sound signals, and an analog-to-digital converter (ADC), which converts analog sound inputs into digital data. The audio manager 140 may also include a digital signal processor. The audio manager 140 also connects to the other components of the electronic device 100, such as the processor 150, the memory 160, and the IVR engine 130. The audio manager could also receive voice input from a port such as a headphone jack, or wirelessly from a wireless microphone.

The interactive voice response engine 130 provides a response to the voice input by determining an intent, a super intent and a sub-intent from the voice input and generating a response based on the determined intents. The interactive voice response engine 130 may be a software program stored in the memory and executed by the processor. In some embodiments, the interactive voice response engine 130 could be implemented with dedicated circuitry, such as a machine learning chip.

The intent is determined from the voice query. The intent can be determined by speech recognition techniques employed on the voice input. The super intent is determined using a plurality of context parameters associated with the physical object and the voice query. The sub-intent is determined using a usage history associated with the user and the object, and the voice input. Usage characteristics are determined from the usage history. Usage characteristics may be, but are not limited to, modes of utilization pertaining to the user and the object, time spent in using the object by the user, and the like. For example, usage characteristics pertaining to the user and a wine bottle can be an amount of wine consumed by the user, the time of the day that the user consumes wine, and the type of wine consumed by the user. In another example, the usage characteristics of a car in association with the user can be, but not limited to a driving speed, an amount of fuel consumed when the user drives the car, a number of braking events, average distance driven in a period, a distance between home and work, and the like.

The super intent is determined from the context parameters. The context parameters can include a visual cue from the user when the viewport of the electronic device 100 is pointed at the object. For example, the user can point the viewport at a specific part of the object. In some embodiments, the context parameters can also include a focal length of the sensors 110, a distance between the user and the object and usage history of the user pertaining to the object.

For example, the user can point the electronic device 100 at a refrigerator, while providing a voice input indicative of how useful the refrigerator could be. The contextual determining module 122 analyzes any visual cues from the user, i.e. if the user focuses the viewport on specific parts of the refrigerator like a freezer or digital controls.

The contextual determining module 122 further analyzes the proximity of the user from the object, and any usage history pertaining to the user and the object from the memory 160 or from a database available on a remote database or computer communicably coupled to the electronic device 100 through the communication network. The contextual determining module 122 determines various scenarios that could have prompted the user to provide the voice input. Usage characteristics from the determined scenarios are analyzed to determine sub-intents. The sub-intent in the current example, could be directed to any monetary benefits that enhances the affordability of the refrigerator to the user. The super intent could be directed to suitability of the refrigerator for the user's needs.

Accordingly, the voice engine 124 generates an interactive voice response. A voice prompt spoken by an expert is determined for providing the interactive voice from a plurality of pre-stored voice prompts. The voice prompts can be pre-stored in the memory 160, stored on a remote database, or stored on a computer accessible by the electronic device 100 through a communication network. The most relevant voice prompt is selected by the voice engine 124 based on the super intent. Based on the super intent that is determined to be directed suitability of the refrigerator for the user's needs, a voice prompt spoken by, for example, a sales executive is used to generate the voice response. If the user continues the interaction with voice queries regarding the hardware components of the refrigerator, or technical queries regarding performance criteria, a voice prompt spoken by an engineer or technical support agent is used to generate and provide the voice response.

The display 120 and the audio manager 140 are communicably coupled to the sensors 110, the interactive voice response engine 130, the processor 150 and the memory 160. The processor 150 can be, but not restricted to, a Central Processing Unit (CPU), a microprocessor, or a microcontroller. The processor 150 is coupled to the memory 160, the sensors 110, the interactive voice response engine 130, the audio manager 140 and the display 120. The processor 150 executes sets of instructions stored on the memory 160.

The memory 160 includes storage locations to be addressable through the processor 150. The memory 160 is not limited to a volatile memory and/or a non-volatile memory. Further, the memory 160 can include one or more computer-readable storage media. The memory 160 can include non-volatile storage elements. For example non-volatile storage elements can include solid-state drive elements, magnetic hard discs, optical discs, floppy discs, flash memories, or forms of electrically programmable memories (EPROM) or electrically erasable and programmable (EEPROM) memories. In some embodiments, the memory 160 stores a plurality of voice sets (hereinafter interchangeably used with voice prompts) from which the most relevant voice set is used to provide an interactive voice response to the user. The memory may store pre-generated voice responses, and the processor can control the speaker to output at least one of the pre-generated voice responses.

Figure 2:
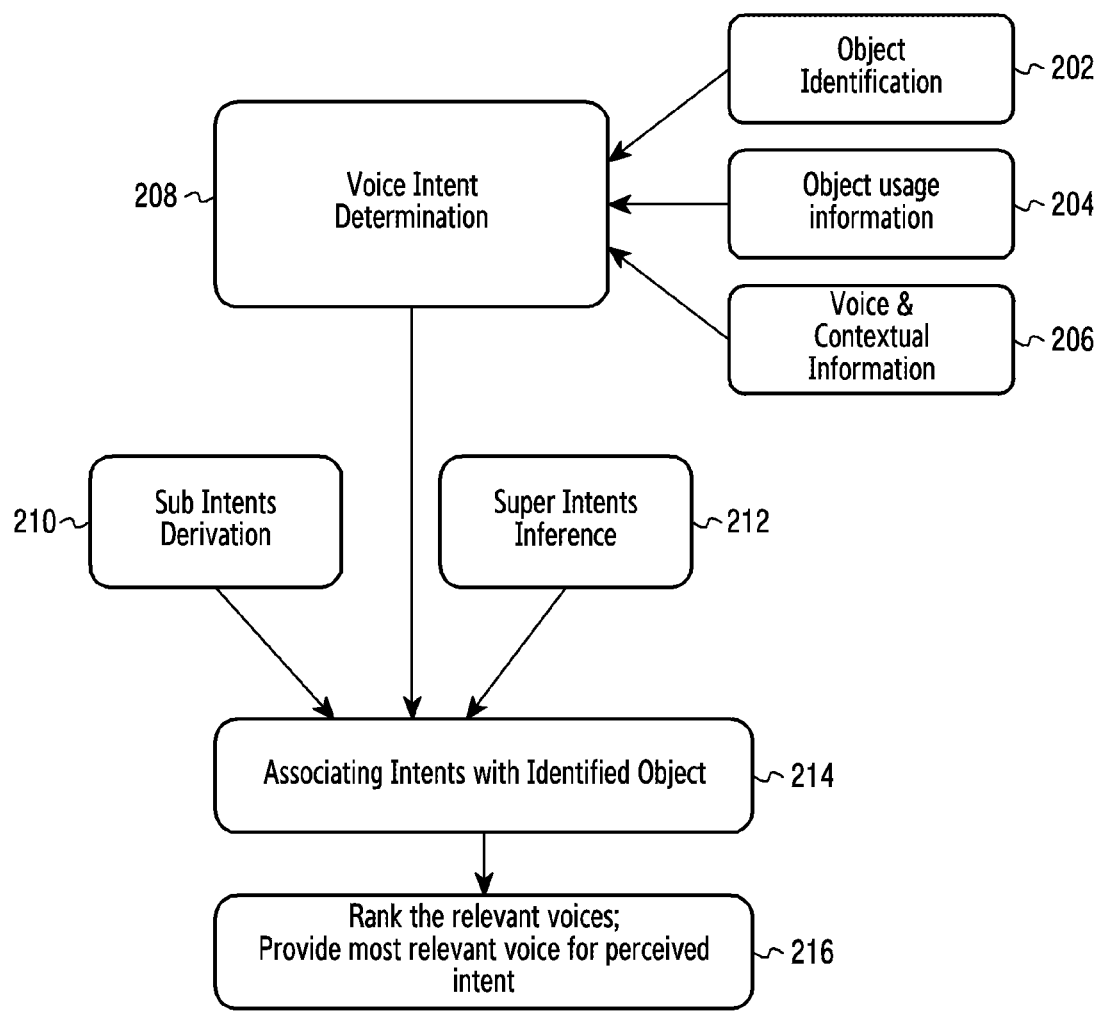
FIG. 2 is a flow diagram illustrating a voice interaction method, according to an embodiment as disclosed herein.

FIG. 2 is a flow diagram illustrating the voice interaction method. It can be understood that operations described below can be performed by the electronic device 100 or any component (e.g., the processor 150, etc.) of the electronic device 100. Referring to FIG. 2, at step 202, the processor 150 identifies the physical object pointed at by the user using the electronic device 100 and captured by the sensors 100. The processor 150 further identifies one or more components of the physical object (hereinafter referred to as "the object"). At step 204, the contextual determining module 122 can receive object usage information pertaining to the user from the memory 160. The audio manager 140 receives the voice input from the user. At step 206, the contextual determining module 122 determines a context of the object based on, but not limited to, a visual cue from the user while providing the voice input, a focal length of the sensors 110, a distance between the user and the object and the object usage information. The visual cue can be a gesture by the user. The gesture can be but not limited to the user pointing at a component of the object on a display of the electronic device 100. From the context, the contextual determining module 122 further determines the super-intent of the voice input based on the context of the object. In some embodiments, the contextual determining module 122 can use natural language processing to determine an intent from the voice input. At steps 208, 210 and 212, the contextual determining module 122 determines the intent, the super-intent and the sub-intent from the voice input respectively. At step 214, the identified object is associated with the determined intent, the determined super-intent and the determined sub-intent. The voice engine 124 generates an interactive voice response, for example, spoken by an expert. The interactive voice response is generated using a voice prompt selected from a plurality of voice prompts pre-stored in the memory 160. Each of the pre-stored voice prompts is spoken by an expert and is associated with a plurality of characteristics. The plurality of characteristics include but are not limited to an experience of the expert associated with the object, a level of knowledge of the expert about the object, a designation of the expert, and an interaction pattern of the user with the expert. At step 216, the pre-stored voice prompts are ranked by relevance in accordance with the determined intent, the determined super-intent and the determined sub-intent. The most relevant voice prompt is selected and used in the interactive voice response.

Figure 3:
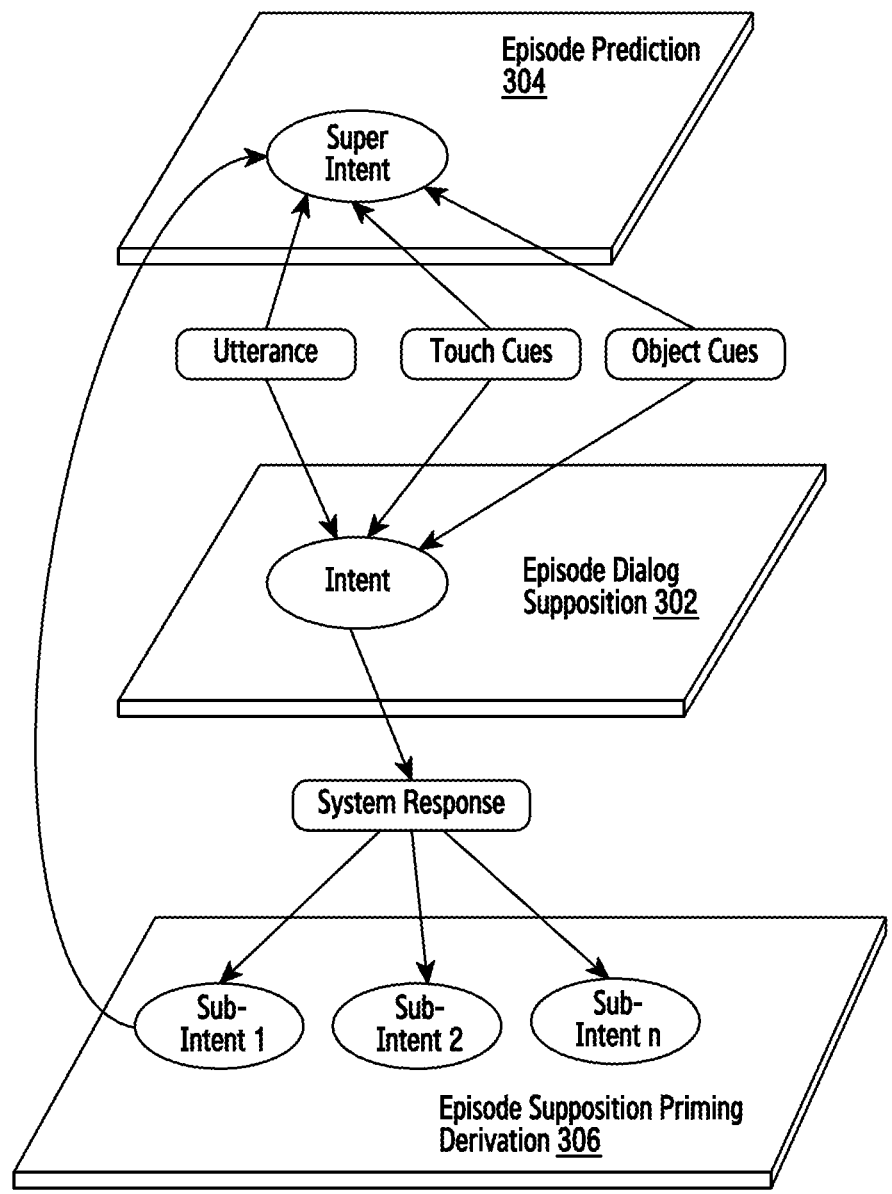
FIG. 3 is a flow diagram illustrating determination of an intent, a super-intent and a sub-intent from a voice input, according to an embodiment as disclosed herein.

FIG. 3 is a flow diagram illustrating the determination of the super intent and the sub-intent from the voice input. The user undergoes a sequence of life events that prompts him to provide the voice input. For example, the user may spend money and work in a certain pattern. In accordance with that lifestyle or necessity, he may be interested in buying the object. The user goes to a corresponding shop that sells the object and points the electronic device 100 at the object. Accordingly, for episode dialog supposition 302, the audio manager 140 receives the voice input and the processor 150 identifies the object and its components. The electronic device 100 can also receive touch cues from the user via the user interface displayed on the display. The context determining module 122 can further obtain the usage history pertaining to the user and the identified object from the memory 160. Based on the voice input, the touch cues, the identified object and its components, the context determining module 122 predicts the super-intent, i.e. the episodic sequence of events that lead the user to provide the voice response (episode prediction 304). The episode dialog supposition 302 provides a dialog state for the interactive response that reflects the intent of the voice input. The voice engine 124 generates the interactive voice response based on the intent and in alignment of the super-intent. Before providing the interactive voice response, sub-intents are derived based on the voice input, touch cues and the usage history (Episode Supposition Priming Derivation 306). Sub-intents are directed to that the user may ask based on the context and the usage history. The interactive voice response is further conditioned to anticipate future interactions with the user while supporting the super-intent.

Figure 4:
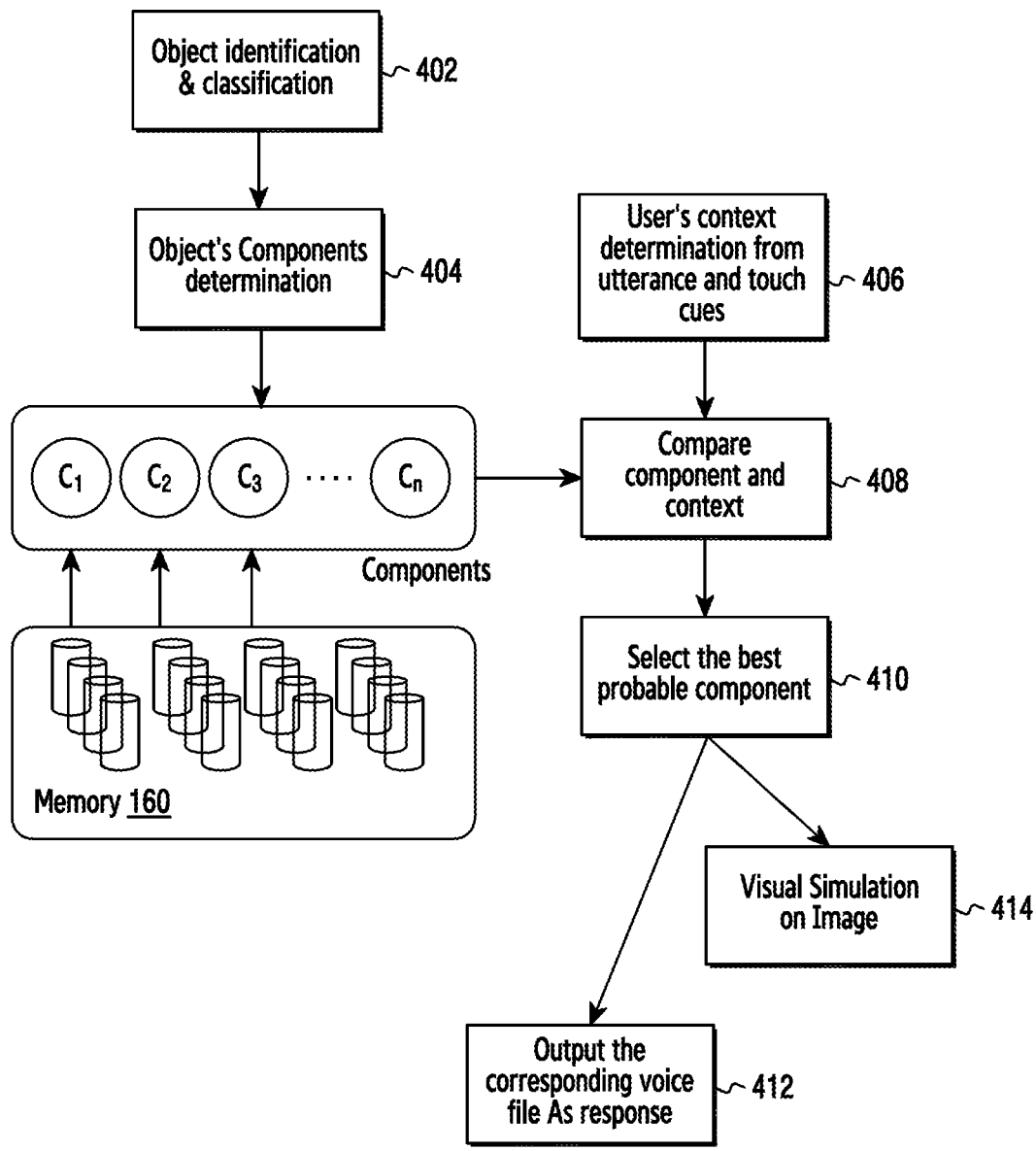
FIG. 4 is a flow diagram illustrating a method for generating a voice response to the voice input, according to an embodiment as disclosed herein.

FIG. 4 is a flow diagram illustrating a method for generating a voice response to the voice input. It can be understood that operations described below can be performed by the electronic device 100 or any component (e.g., the processor 150, etc.) of the electronic device 100. Referring to FIG. 4, at step 402, the object is identified by the processor 150, when the user points the electronic device 100 at the object and the object is captured by the sensors 100. At step 404, the various components are further identified based on the identified object. Deep neural network spatio-temporal methods of multi-object perception and identification may be implemented for object identification. In some embodiments, the user can provide touch cues such as pointing at a component of the object or using a touch screen of the display 120 of the electronic device 100 to zoom in to the image of the object displayed when the electronic device 100 is pointed at the object. At step 404, the component pointed at by the user or the components in the portions of the image zoomed in by the user are identified. At step 406, the context is determined based on the voice input and the touch cues. Accordingly, the super-intent, the sub-intent and the intent are determined. The server can store images of the object and its various components. Based on spatio-temporal methods, the components are identified and at step 408 the components are compared with the context determined from the voice input and touch cues. At step 410, the best probable component that matches the context is selected and determined to be of interest to the user. Accordingly, the voice prompt corresponding to the selected best probable component is used by the voice engine 124 to generate the interactive voice response. At step 412, the generated voice response is provided as output through the speakers 180 of the electronic device 100. The electronic device 100 may also provide a visual response on the display 120 that can augment the voice response. The visual response may be an animation or a video indicative of an expert providing the generated interactive response.

In some embodiments, the interactive voice response is conditioned based on the user moving closer to the object or zooming in using the sensors 110. A change in visual simulation of the image of the object can also change the voice response.

Figure 5:
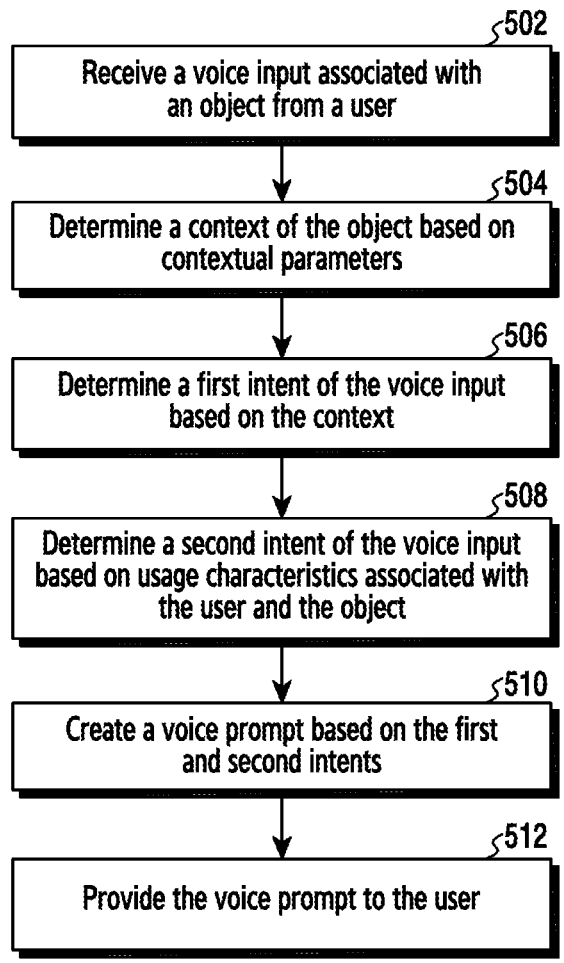
FIG. 5 is a flow diagram illustrating a method to provide a voice prompt to the user based on determination of the intent, the super intent and the sub-intent, according to an embodiment as disclosed herein.

FIG. 5 is a flow diagram illustrating a method 500 to provide a voice prompt to the user based on determination of the intent, the super intent and the sub-intent. It can be understood that operations described below can be performed by the electronic device 100 or any component (e.g., the processor 150, etc.) of the electronic device 100. Referring to FIG. 5, at step 502, the user points the viewport of the electronic device 100 at the object and provides the voice input that is captured by a microphone 170 provided with the electronic device 100. The sensors 110 capture an image of the object. The object is dynamically recognized by the server using the captured image. The user may also provide touch cues pertaining to the various components of the object. At steps 504 and 506, the touch cues along with the voice input are used to determine the context of the voice input and, subsequently a first intent. The first intent is determined using a plurality of context parameters of the object. The context parameters can include from a visual cue from the user when the viewport of the electronic device 100 is pointed at the object. For example, the user can point the viewport at a specific part of the object. In some embodiments, the context parameters can also include a focal length of the sensors 110, a distance between the user and the object and usage history of the user pertaining to the object.

The contextual determining module 122 (shown in FIG. 1B) further analyzes the proximity of the user from the object and any usage history pertaining to the user and the object from the memory 160 (shown in FIG. 1A) or from a database available on a remote database or computer communicably coupled to the electronic device 100 through the communication network. At step 508, the contextual determining module 122 determines various scenarios that could have prompted the user to provide the voice input. Usage characteristics from the determined scenarios are analyzed to determine a second intent. The second intent is determined based on the context and the usage history. Accordingly, at steps 510 and 512, a relevant voice response to the voice input is generated by the server or the electronic device 100 and provided to the user.

Based on spatio-temporal methods, the components are identified and are compared with the context determined from the voice input and touch cues. The best probable component that matches the context is selected and determined to be of interest to the user. Accordingly, the voice prompt corresponding to the selected component is used by the voice engine 124 to generate the interactive voice response. The memory 160 or the server can pre-store a plurality of voice prompts that can be associated with each component of the object. Each voice prompt can be spoken by an expert that is part of the supply chain pertaining to the object. For example, the voice prompts can include voice prompts spoken by a sales manager, sales representative or an engineer. The generated voice response is provided as output through the speakers 180 of the electronic device 100.

As aforementioned with reference to FIG. 5, the electronic device performs operations illustrated in FIG. 5. In another embodiment, at least one operation among the operations illustrated in FIG. 5 may be performed another electronic device (e.g., a server). For example, the electronic device may transmit information regarding the voice input and other information (e.g., the image and so on), and the server may perform, e.g., steps 504, 506, 508 and 510, or only some of these steps, and then transmit at least one voice prompt to the electronic device.

Figure 6:
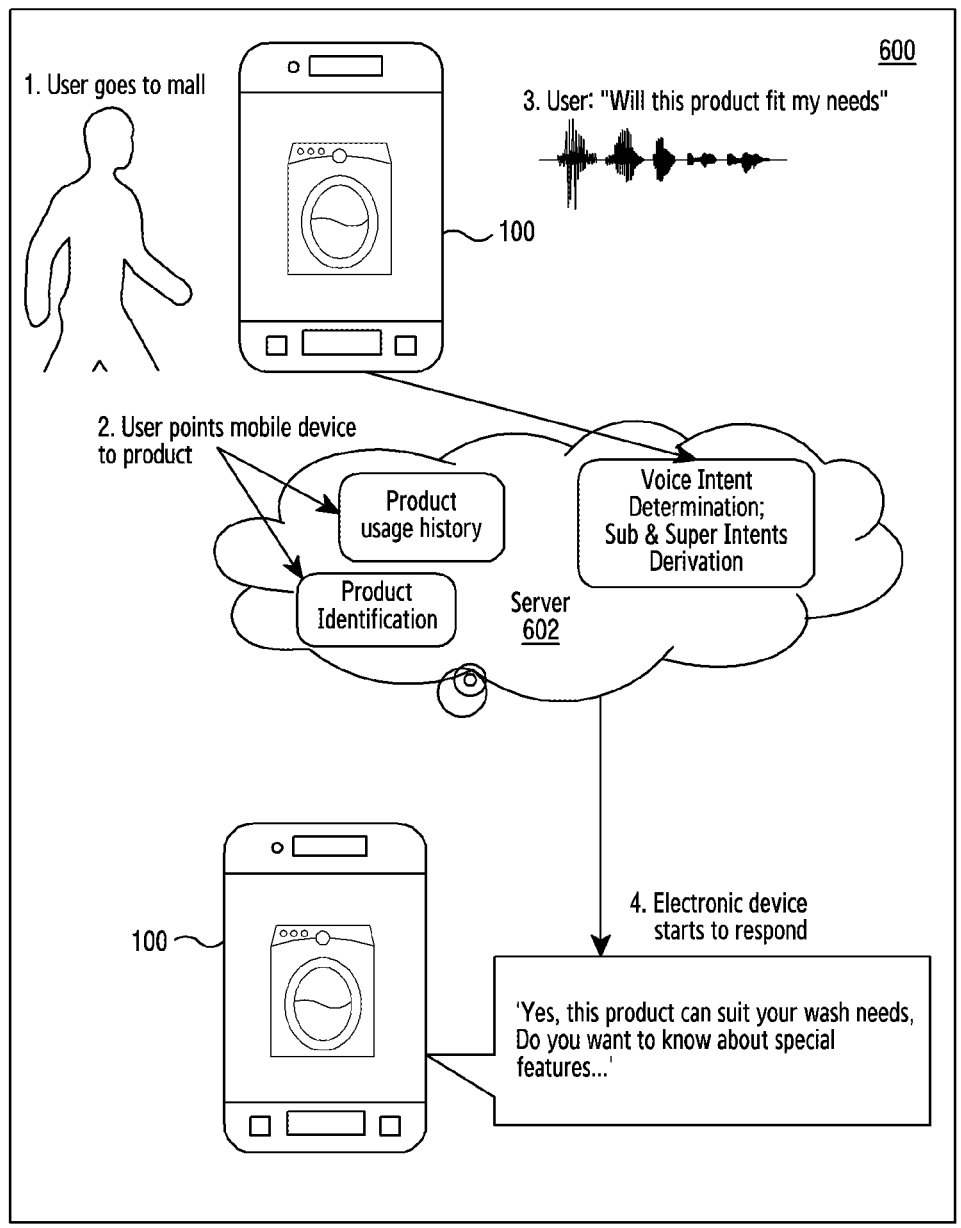
FIG. 6 is an example scenario illustrating a method to provide the voice response to the voice input with regard to a washing machine, according to an embodiment as disclosed herein.

FIG. 6 is an example scenario 600 illustrating a method to provide the voice response to the voice input with regard to a washing machine. The user goes to a mall to inquire about a washing machine. The user points the electronic device 100 at the washing machine. The user further provides a voice input as shown in FIG. 6 (e.g., "will this product fit my needs?"). Based on the image captured by the electronic device 100, the server 602 identifies the object and various components of the object. The server 602 further determines an intent, a sub-intent and a super-intent based on the voice input, usage history and any touch cues that the user may provide. In this example, the server 602 infers the super-intent to be to buy the washing machine and the sub-intent of needs. Accordingly, the voice engine 124 (shown in FIG. 1B) provides a voice response (e.g., "Yes, this product can suit your washing needs") as spoken by a sales representative. Based on the determined sub-intents, the voice response can also include a query indicative of whether the user would like to know more about the special features that cater to the user's needs (e.g., "Do you want to know about special features?"). Further, the response is provided through the electronic device 100.

Figure 7:
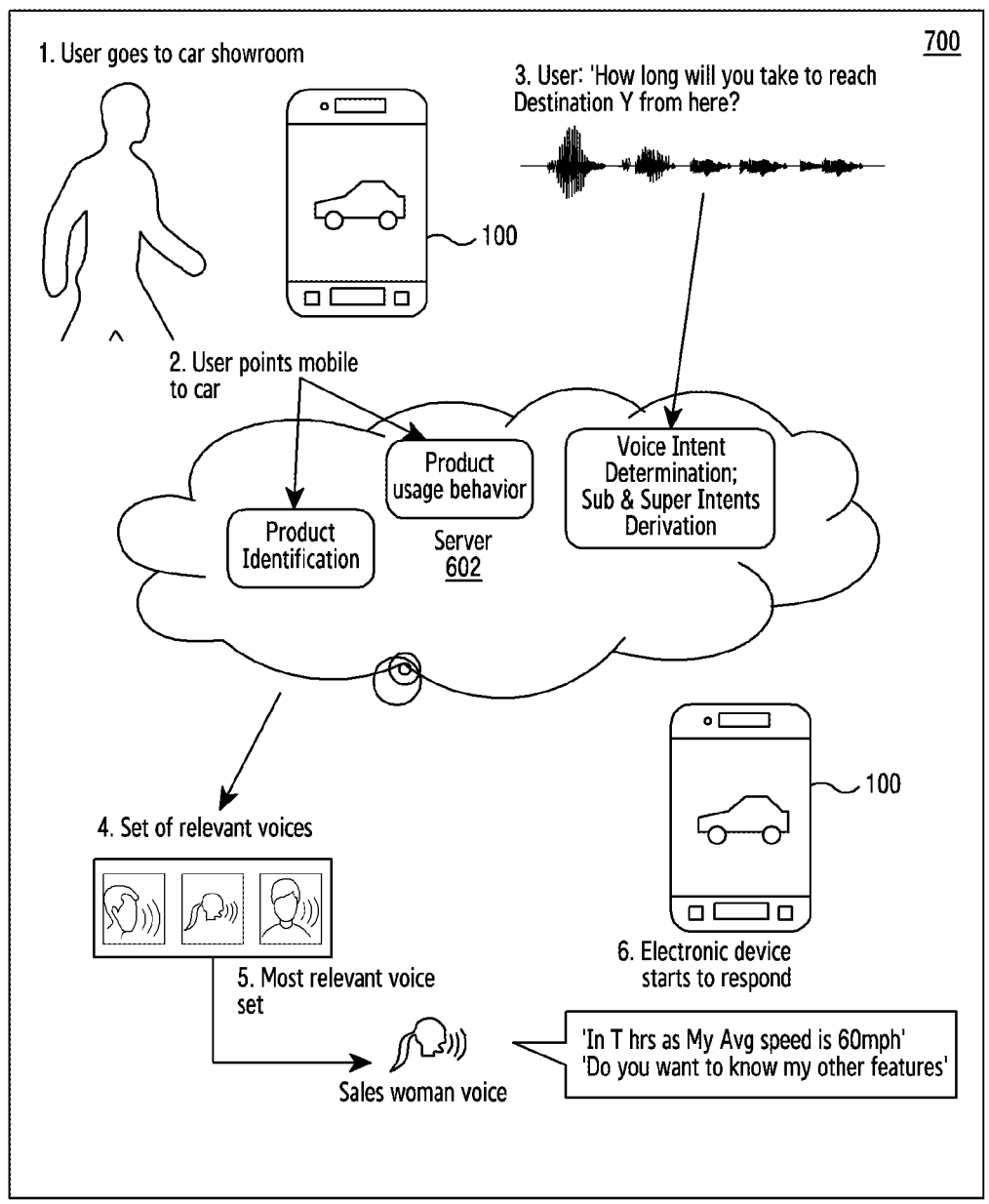
FIG. 7 is an example scenario illustrating a method to provide the voice response to the voice input with regard to a car, according to an embodiment as disclosed herein.

FIG. 7 is an example scenario 700 illustrating a method to provide the voice response to the voice input with regard to a car. The user goes to a car showroom to inquire about a car. The user points the electronic device 100 at the car. The user further provides a voice input as shown in FIG. 7 (e.g., "How long will you take to reach destination Y from here?"). Based on the image captured by the electronic device 100, the server 602 identifies the object and various components of the object. The server 602 further determines an intent, a sub-intent and a super-intent based on the voice input, usage history and any touch cues that the user may provide. In this example, the server 602 infers the super-intent to be to buy the car and the intent of the user to reach a particular destination. The server 602 further determines the sub-intent to be to check if the car can provide good mileage and speed. Accordingly, the voice engine 124 (shown in FIG. 1B) provides a voice response as spoken by a sales representative (e.g., "In T hours as my average speed 60 mph"). The most relevant voice prompt is chosen to generate the interactive voice response. Based on the determined sub-intents, the voice response can also include a query indicative of whether the user would like to know more about the special features that cater to the user's needs (e.g., "Do you want to know about my other features?").

Figure 8:
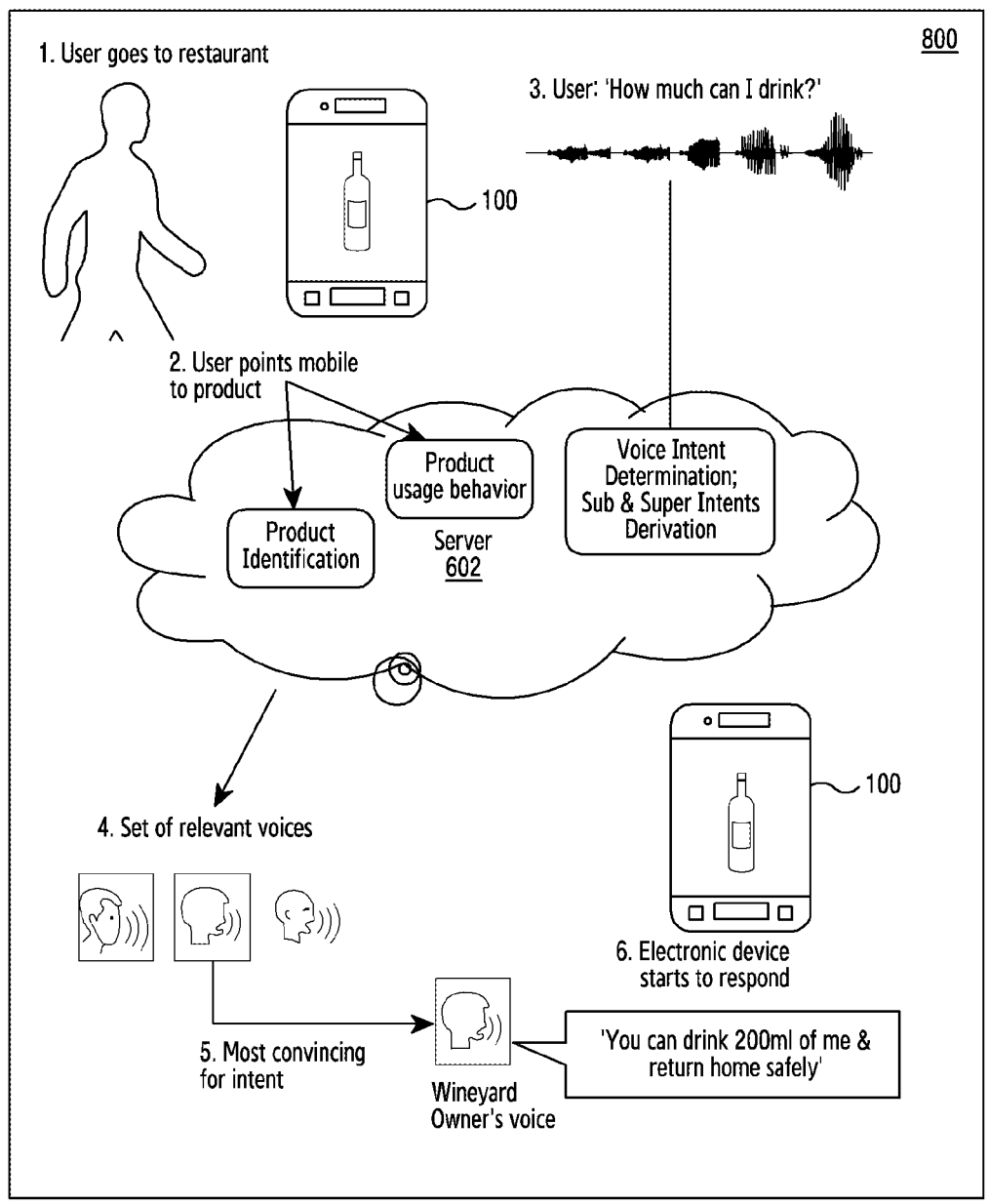
FIG. 8 is an example scenario illustrating a method to provide the voice response to the voice input with regard to wine, according to an embodiment as disclosed herein.

FIG. 8 is an example scenario 800 illustrating a method to provide the voice response to the voice input with regard to a wine bottle. The user goes to a restaurant. The user points the electronic device 100 at the wine bottle. That is, the user takes a photograph of the wine bottle by using a camera or image sensors of the electronic device 100, and then the electronic device 100 captures an image of the wine bottle. The user further provides a voice input (e.g., "How much can I drink?") as shown in FIG. 8. Based on the image captured by the electronic device 100, the server 602 identifies the object and various components of the object. The server 602 further determines at least one intent including at least one of the intent, sub-intent and the super-intent based on the voice input, usage history and any touch cues that the user may provide. In this example, the server 602 infers the super-intent to be to purchase or consume another wine bottle if the wine is good and the intent of the user to be to check if the quantity of wine that can be consumed to drive safely. The server 602 further determines the sub-intent to be to check if the user can reach home safely upon consumption. Accordingly, the voice engine 124 (shown in FIG. 1B) provides a voice response (e.g., "You can drink 200 ml of me and return home safely") as spoken by a wine yard owner. The most relevant voice prompt is chosen to generate the interactive voice response. Based on the determined sub-intents, the voice response includes the permissible amount to be consumed by the user such that the user can reach home safely. The response is further conditioned based on the wine bottle identified. For example, a different wine brand may have different permissible amounts that can be consumed, due to varying amounts of alcohol in different types of wine. That is, the electronic device 100 and/or the server could calculate an appropriate amount of wine consumption based on at least one of the amount of alcohol in the wine, the user's body weight, and an amount of alcohol previously consumed by the user during the preceding hours.

Although the embodiments shown in FIGS. 6-8 describe situations where a user travels to a mall, shop, or restaurant, and captures an image of a physical and tangible object with a smartphone or other electronic device, the present disclosure is not so limited. In another embodiment, the above-described aspects of the present disclosure could also apply to a situation where a user is shopping for products online while at home or while not present inside a retail store. In this situation, the user could browse an online store, whereby multiple products would be displayed on a display screen of an electronic device of the user. The electronic device could be a smartphone, desktop computer, or tablet computer, but the form is not particularly limited. The user may then select a product that is available for purchase. After this selection, a particular product that is purchasable is shown on the display screen. The user may then ask a question about the purchasable product. For example, the user could ask, with regard to a smartwatch that is purchasable, "how long does the battery last?" This inquiry would be received by at least one microphone of the electronic device. Subsequently, the electronic device could generate a response to this question by taking into account the currently displayed product, and analyzing the user's question with natural language processing. For example, the electronic device could generate a response of "the battery lifetime is about 12 hours on average." The step of generating the response could be performed by a server, e.g., the electronic device could send the voice inquiry and information on the purchasable product to the server, the server would generate the response, and then the server would send the response back to the user's electronic device. The user's electronic device could then output the generated response by outputting an auditory response to the user's question, regardless of how the response is generated. Any of the particular techniques described with regard to the other embodiments could also be applied to this online shopping embodiment.

As aforementioned embodiments, the electronic device may obtain at least one input (e.g., a voice input, an image, a usage history, a gesture and so on), and then generate a response based on the at least one input. In another embodiment, the electronic device may generate a plurality of responses, and provide the responses and priority information of the responses. That is, the responses may have different priorities based on a probability that determined intent is correct.

For example, the electronic device provides a main response and at least one alternative response. In an embodiment, the electronic device provides the main response in the form of a voice output, and displays information regarding at least one alternative response in the interface. The electronic device displays a interface for notifying the user that there is at least one alternative response. Specifically, the interface may include at least one item (e.g., icon, button and so on). If the user selects an item among the at least one item, the electronic device outputs an alternative response corresponding to the selected item. Further, the electronic device may display priority information regarding at least one alternative response in the interface.

The embodiments disclosed herein can be implemented through at least one software program running on at least one hardware device and performing network management functions to control the elements. The elements shown in FIGS. 1A-8 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method comprising:
   obtaining, by an electronic device, a voice input of a user via a microphone of the electronic device, and an image of an object captured by using a camera of the electronic device;
   identifying a plurality of intents of the user, based on the voice input of the user and the captured image of the object;
   selecting a relevant voice prompt from among a plurality of voice prompts, based on at least one of the plurality of intents identified from the voice input, wherein the plurality of voice prompts is ranked based on relevance of the identified plurality of intents;
   generating a response associated with the object, based on the selected voice prompt; and
   displaying, via a display the electronic device, the captured image of the object while outputting the response audibly via a speaker of the electronic device,
   wherein the identifying the plurality of intents comprises:
      identifying the object;
      identifying a first intent from the voice input based on a context of the object determined based on a plurality of contextual characteristics and a user gesture while providing the voice input; and identifying a second intent from the voice input based on a user activity and the usage characteristics determined based on a usage history associated with the user and the object, wherein the usage history is obtained from a memory of the electronic device or an available database.

2. The method of claim 1, further comprising recognizing the object based on information received from the camera of the electronic device.

3. The method of claim 1, wherein the plurality of contextual characteristics comprises at least one from among a visual cue from the user while providing the voice input, a focal length of the camera, a distance between the user and the object, or an object usage behavior of the user.

4. The method of claim 1, wherein the plurality of voice prompts is associated with a plurality of characteristics, and
wherein the plurality of characteristics comprises at least one from among an experience of an expert associated with the object, a level of knowledge of the expert about the object, a designation of the expert, or an interaction pattern of the user with the expert.

5. The method of claim 1, further comprising:
displaying information regarding an alternative response; and
outputting the alternative response in response to a selection of the user.

6. An electronic device comprising:
a memory; and
a processor configured to:
obtain, via a microphone, a voice input of a user, and an image of an object captured by using a camera;
identify a plurality of intents of the user based on the voice input of the user and the captured image of the object;
select a relevant voice prompt from among a plurality of voice prompts, based on at least one of the plurality of intents identified from the voice input, wherein the plurality of voice prompts is ranked based on relevance of the identified plurality of intents;
generate a response associated with the object, based on the selected voice prompt; and
control a display to display the captured image of the object while controlling a speaker of the electronic device to output the response audibly,
wherein the processor is further configured to identify the plurality of intents by:
identifying the object;
identifying a first intent from the voice input based on a context of the object determined based on a plurality of contextual characteristics and a user gesture while providing the voice input; and
identifying a second intent from the voice input based on a user activity and a usage history associated with the user and the object, wherein the usage history is obtained from the memory or an available database.

7. The electronic device of claim 6, wherein the processor is further configured to recognize the object based on information received from the camera.

8. The electronic device of claim 6, wherein the plurality of contextual characteristics comprises at least one from among a visual cue from the user while providing the voice input, a focal length of the camera, a distance between the user and the object, or an object usage behavior of the user.

9. The electronic device of claim 6, wherein the plurality of voice prompts is associated with a plurality of characteristics, and
wherein the plurality of characteristics comprises at least one from among an experience of an expert associated with the object, a level of knowledge of the expert about the object, a designation of the expert, or an interaction pattern of the user with the expert.

10. The electronic device of claim 6, wherein the processor is further configured to:
control the display to display information regarding an alternative response; and
output the alternative response in response to a selection of the user.

* * * * *